(12) United States Patent
Omi et al.

(10) Patent No.: US 8,166,395 B2
(45) Date of Patent: Apr. 24, 2012

(54) INFORMATION PROCESSING METHOD AND APPARATUS

(75) Inventors: Hiromi Omi, Yokohama (JP); Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1593 days.

(21) Appl. No.: 11/277,371

(22) Filed: Mar. 24, 2006

(65) Prior Publication Data

US 2006/0224961 A1 Oct. 5, 2006

(30) Foreign Application Priority Data

Apr. 4, 2005 (JP) ................. 2005-107743

(51) Int. Cl.
*G06F 3/00* (2006.01)
(52) U.S. Cl. ...................... 715/709; 715/705
(58) Field of Classification Search ................. 715/705, 715/709, 708; 345/156
See application file for complete search history.

(56) References Cited

U.S. PATENT DOCUMENTS

| | | | |
|---|---|---|---|
| 6,104,334 A * | 8/2000 | Allport | 341/175 |
| 6,222,539 B1 * | 4/2001 | Watts | 715/708 |
| 6,344,793 B1 | 2/2002 | Geck et al. | 340/425.5 |
| 2004/0194152 A1 | 9/2004 | Yamada et al. | 725/135 |

FOREIGN PATENT DOCUMENTS

| | | |
|---|---|---|
| CN | 1581293 A | 2/2005 |
| EP | 0371284 | 6/1990 |
| EP | 0630146 | 12/1994 |
| EP | 1031456 | 8/2000 |
| EP | 1477895 | 11/2004 |
| JP | 09-146476 | 6/1997 |
| JP | 2003-51908 | 2/2003 |
| JP | 2004-061827 | 2/2004 |
| JP | 2004-302300 | 10/2004 |

OTHER PUBLICATIONS

Japanese Office Action dated May 14, 2010 in corresponding Japanese Application No. 2005-107743.

\* cited by examiner

*Primary Examiner* — Omar Abdul-Ali
(74) *Attorney, Agent, or Firm* — Fitzpatrick, Cella, Harper & Scinto

(57) ABSTRACT

An information processing apparatus having the action modes, including an operating mode for performing an operation on the apparatus and an explaining mode for presenting an explanation corresponding to the operation on the apparatus presents the explanation for an operation input made in the explaining mode and stores the operation input. And it makes a movement from the explaining mode to the operating mode as well as executes the action according to the operation input stored in storage unit in accordance with a preset first operation input.

13 Claims, 15 Drawing Sheets

FIG. 2A
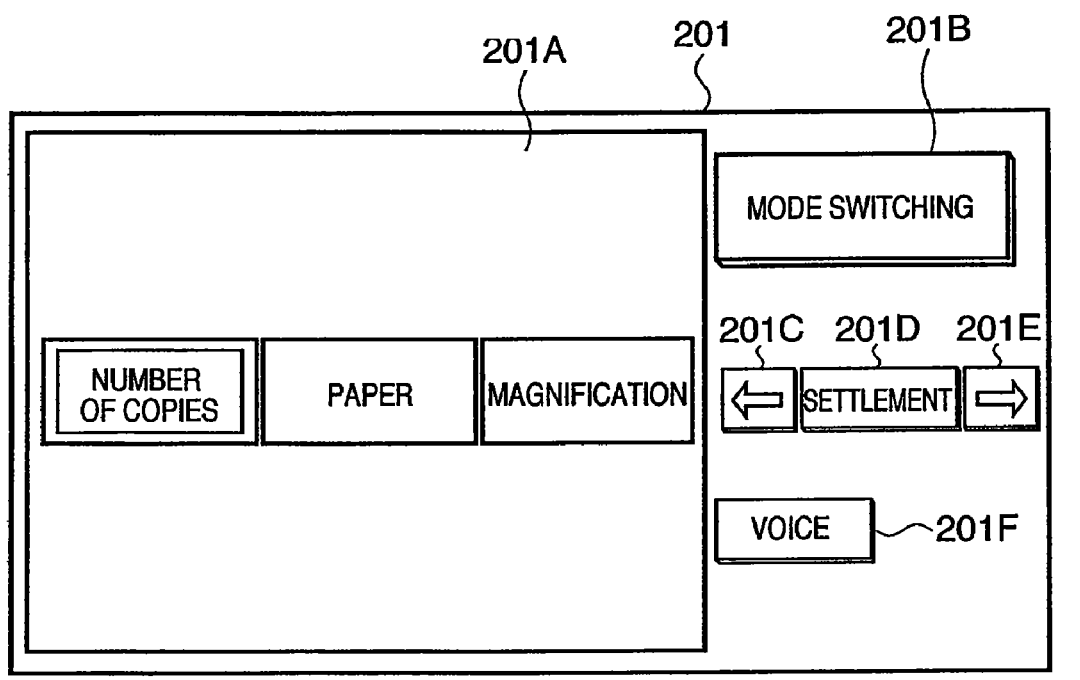
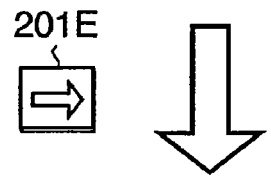
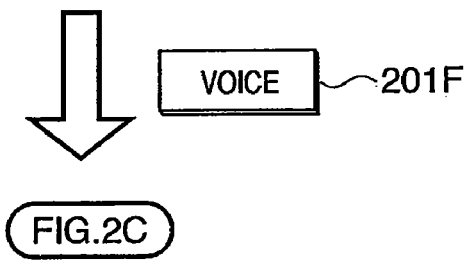

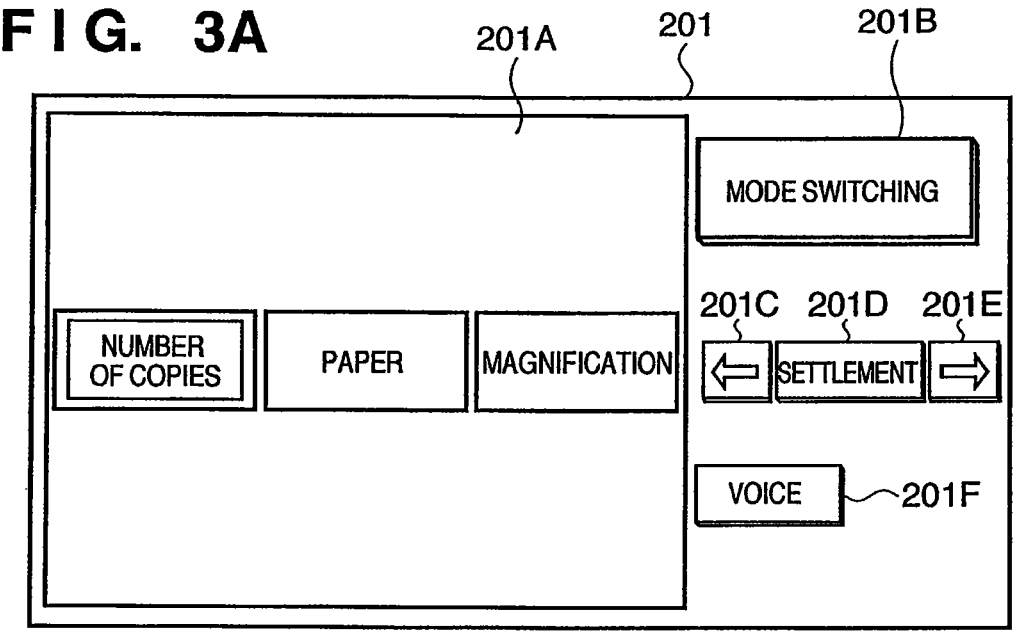
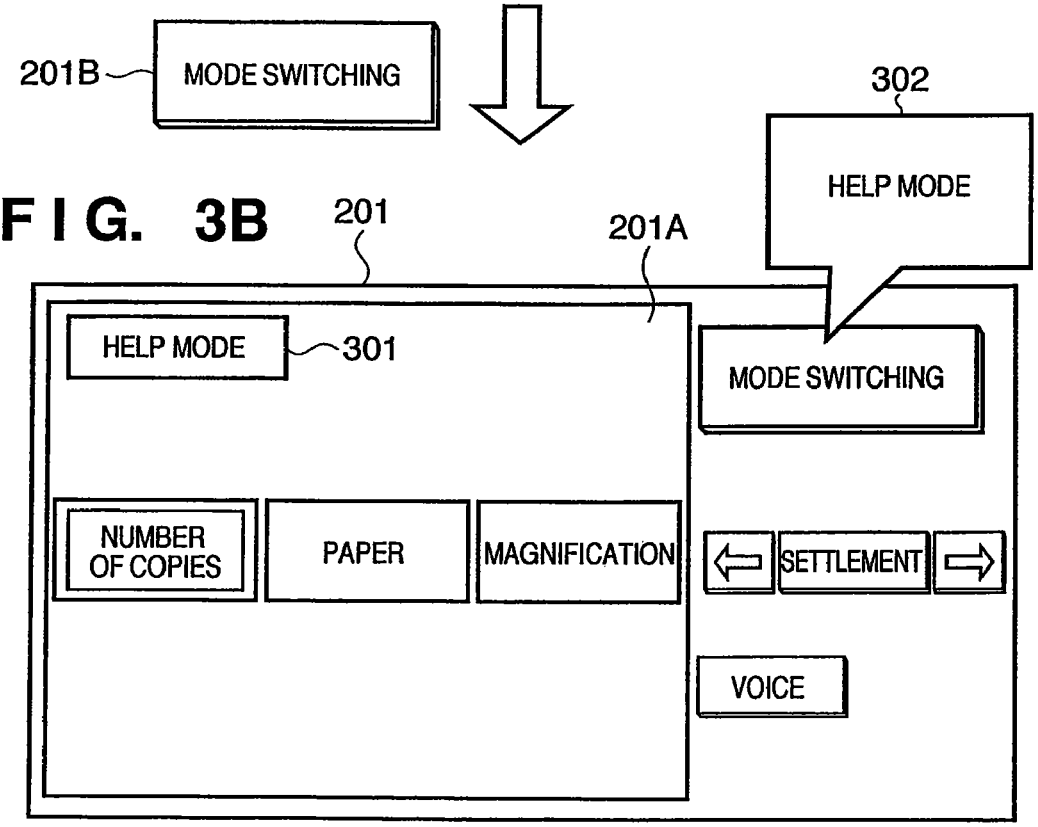

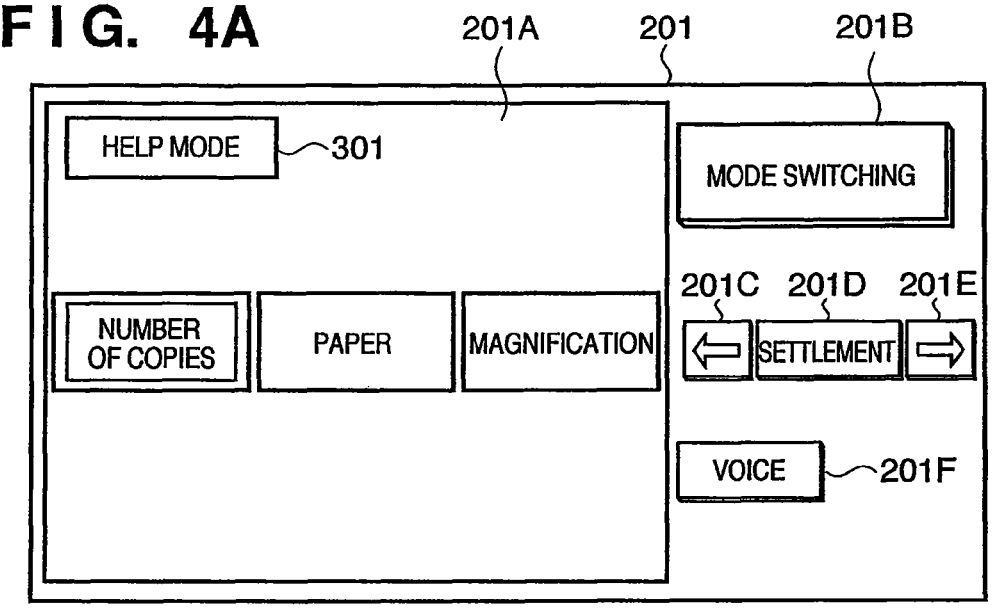
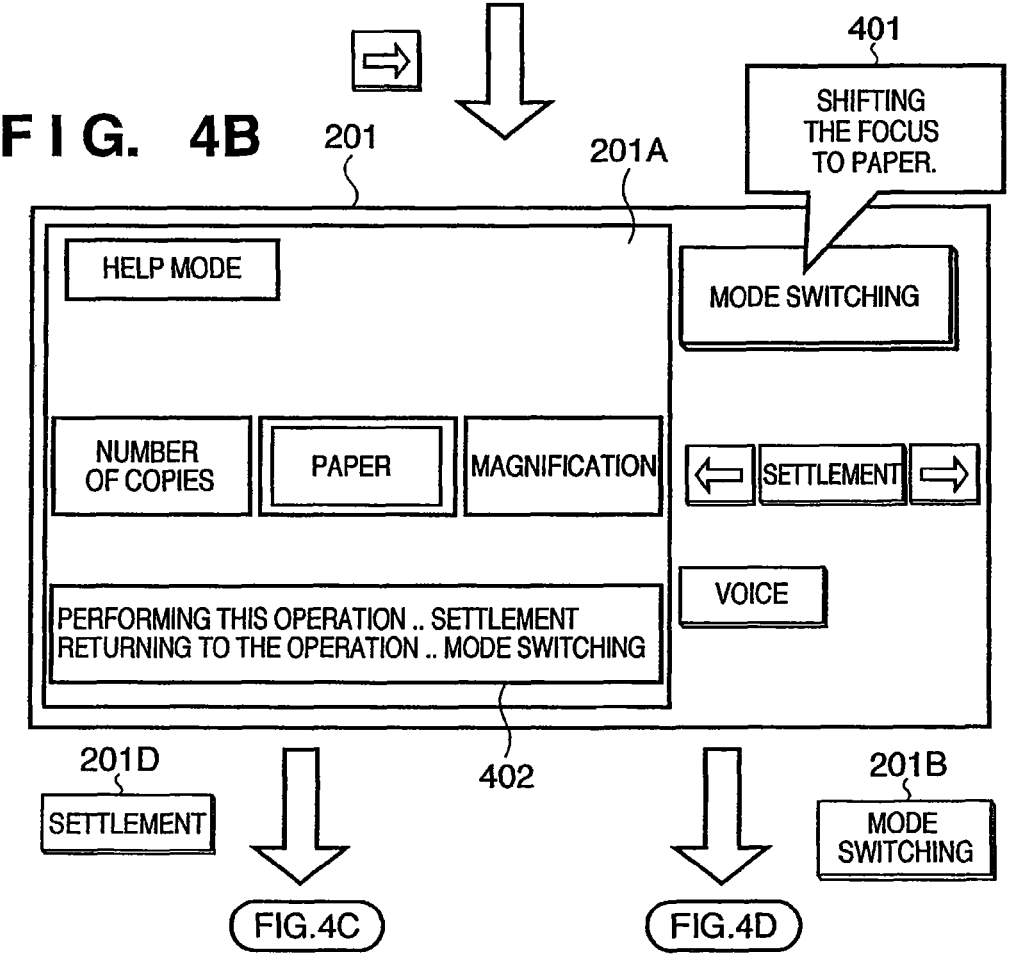

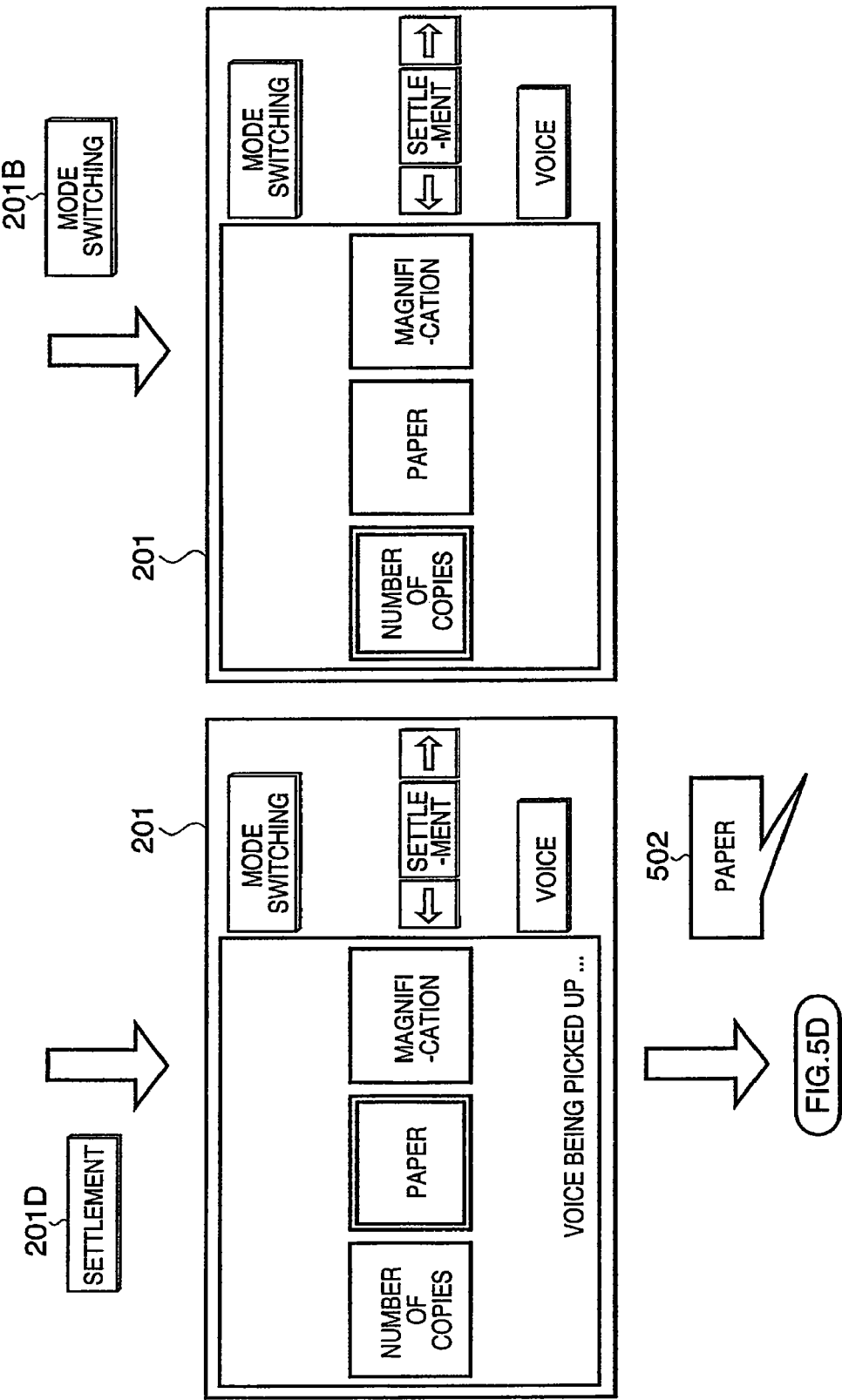

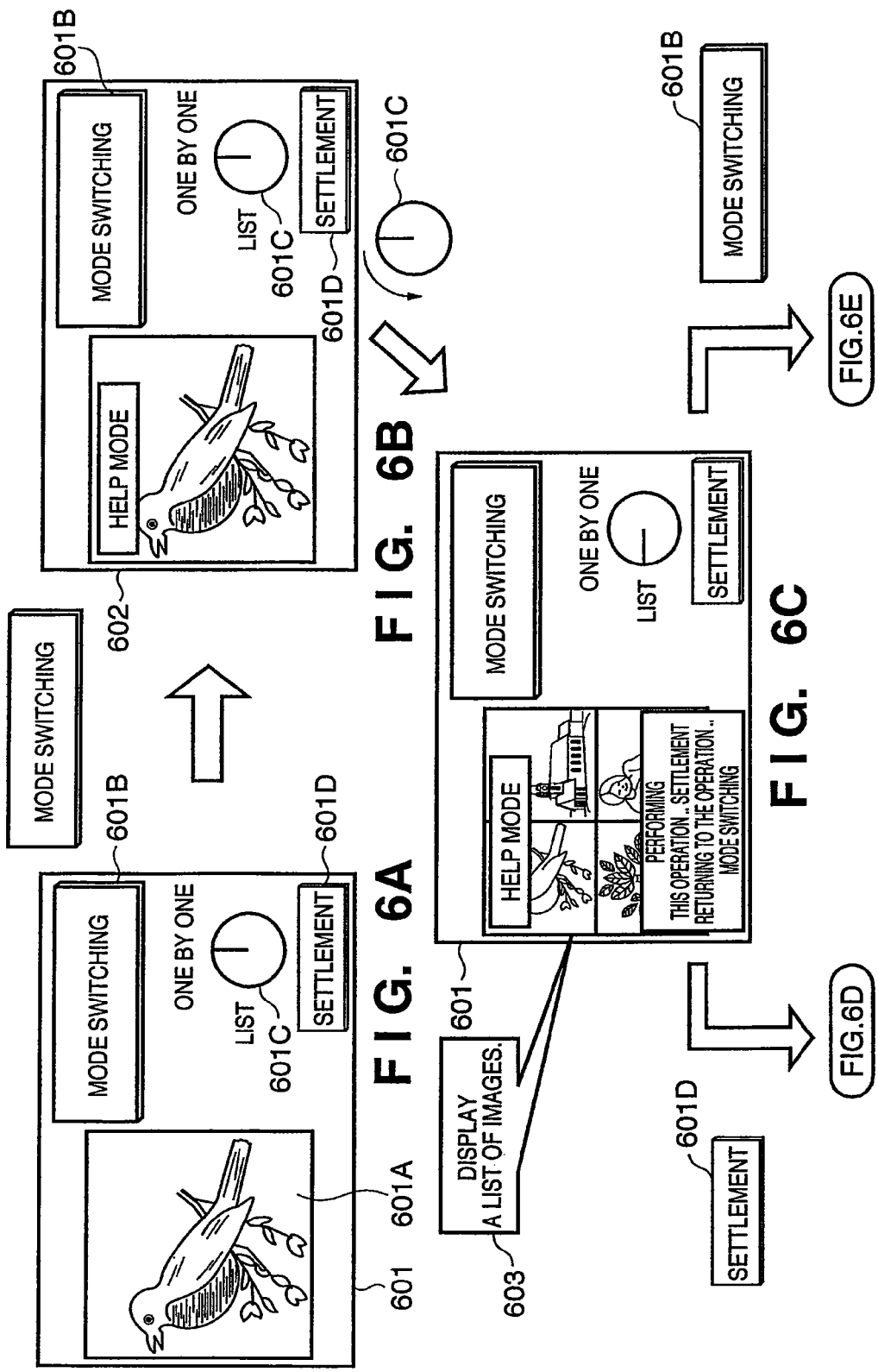

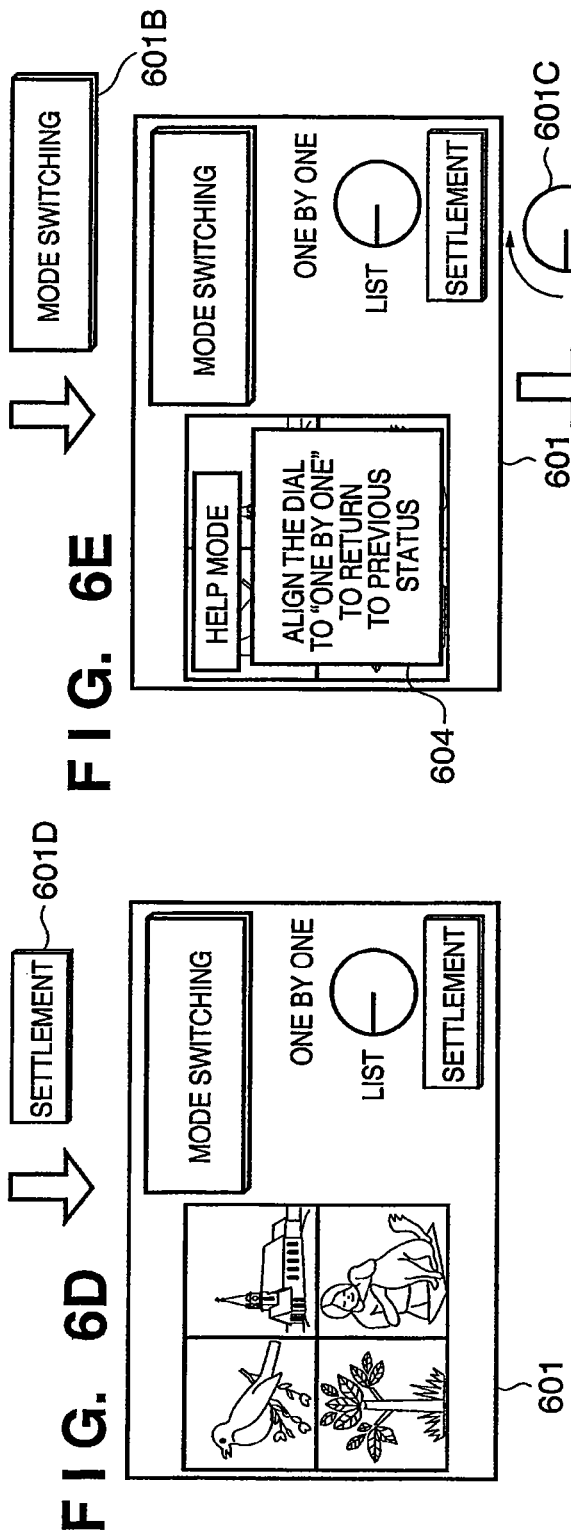
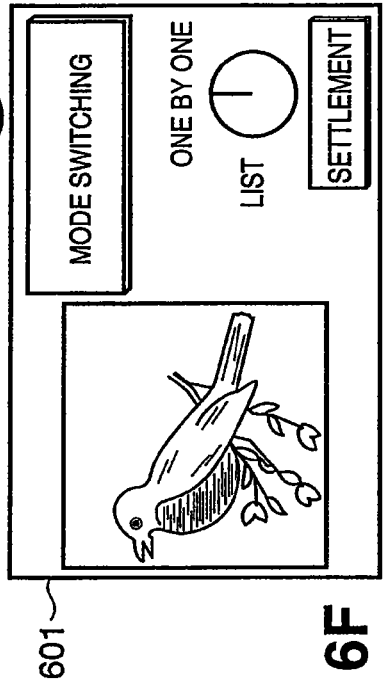
FIG. 6E
FIG. 6F
FIG. 6D

INFORMATION PROCESSING METHOD AND APPARATUS

FIELD OF THE INVENTION

The present invention relates to an information processing method and apparatus, and more particularly, to a user interface for a user to make various operation instructions to an information processing apparatus.

BACKGROUND OF THE INVENTION

In various information processing apparatuses, the user interface (UI) for enabling the user to operate them has been more complex as they are provided with higher functions. For example, even when the same key is depressed with the same procedure, the quite different operation may be consequently performed if the machine status is different in starting the operation. In this manner, one function is not allocated to one key or button, but multiple different functions are allocated depending on the status. This form has a merit that the number of operation parts is reduced and the universality is improved, and is convenient. On the other hand, the user is obliged to perform more complicate operation. Accordingly, particularly in the apparatus having such UI, it is essential to present a more comprehensive operation explanation to the user.

As an example of presenting the operation explanation depending on the machine status, a method for outputting by voice the explanation of action corresponding to the operation in a help mode has been offered in Japanese Patent Application Laid-open No. 2004-302300. Also, a method for selecting an operation guidance according to the status where an operation key is depressed (selecting the function explanation for the operation key when the depressing time is short or selecting the operation content explanation settled by the operation when the depressing time is long), and outputting the explanation by voice has been offered in Japanese Patent Application Laid-open No. 2004-61827.

In Japanese Patent Application Laid-open No. 2004-302300, a button associated action can be explained by voice in the help mode. And the button associated operation as explained is stored, and its action content is performed by operating the execution key. This action is performed in the help mode, and to exit from the help mode, the user must explicitly perform an operation of exiting from the help mode. In Japanese Patent Application Laid-open No. 2004-61827, it has been offered that when the depressing time of the operation key is two seconds or less in a learning mode, the function explanation of the operation key is made by voice, and when the depressing time is six seconds or more, the action corresponding to the operation key is performed. To move from the learning mode to the normal operating mode, an explicit operation for movement is required. In this manner, it is required to necessarily perform some explicit operation to move from the action mode for acquiring the operation guidance such as the help mode or learning mode to the normal operating mode. However, this form is suitable for the initial user unfamiliar with the operation method, but not user-friendly when the skilled user sometimes employs the help.

Also, in Japanese Patent Application Laid-open No. 2004-302300 and Japanese Patent Application Laid-open No. 2004-61827, the explanation concerning the operation button is not specifically presented. For example, in Japanese Patent Application Laid-open No. 2004-61827, the function explanation of "Advancing to the right (in the menu)" is made for the operation of a "6" key, but the explanation of operation result is not given. That is, the operation result of the "6" key is changed depending on at which position the current machine status resides in the menu, but no explanation is given as to what operation result is obtained in accordance with each status. Also, in Japanese Patent Application Laid-open No. 2004-302300, the explanation concerning a "reset button" is described, but there is no description as to what explanation is uttered for the button in which the operation result is changed depending on the machine status.

Also, in Japanese Patent Application Laid-open No. 2004-302300 and Japanese Patent Application Laid-open No. 2004-61827, the voice input operation of the user is not considered. For example, in Japanese Patent Application Laid-open No. 2004-302300, in a mode of making the operation explanation, if the user depresses a button having a function of starting the voice input, it is only presented that "If this button is depressed, the voice can be inputted." that is the corresponding action of the button. That is, no consideration is taken to present the explanation of which voice input is allowed according to the current machine status.

For example, it is considered that in the mode of making the operation explanation, after the action explanation is effected by operating an input unit that is not automatically restored to its original status, such as rotating the dial, the normal operating mode may be restored. When the normal operating mode is restored, it is general to restore the internal machine status to the status immediately before movement to the help mode. Accordingly, in this case, when the normal operating mode is restored, a mismatch may occur between the internal machine status (status before rotating the dial) and the status of the input unit (status after rotating the dial). In Japanese Patent Application Laid-open No. 2004-302300 and Japanese Patent Application Laid-open No. 2004-61827, such a characteristic intrinsic to the hardware is not considered.

SUMMARY OF THE INVENTION

This invention has been achieved by solving at least a part of these problems, and it is an object of the invention to improve the operability in the user interface having an operation guidance function.

According to one aspect of the present invention, there is provided an information processing apparatus having the action modes, including an operating mode for performing an operation on the apparatus and an explaining mode for presenting an explanation corresponding to the operation on the apparatus, comprising: a presentation unit configured to present the explanation for an input of the operation mode in the explaining mode; a storage unit configured to store the input of the operation; and a movement control unit configured to effect a movement from the explaining mode to the operating mode, as well as performing the action according to the input of the operation stored in the storage unit in accordance with a preset first operation input.

Also, according to another aspect of the present invention, there is provided an information processing apparatus having the action modes, including an operating mode for performing an operation on the apparatus and an explaining mode for presenting an explanation corresponding to the operation on the apparatus, comprising: an acquisition unit configured to acquire a machine status of the information processing apparatus at the time of movement to the explaining mode; a decision unit configured to decide the presentation content of explanation for the operation input based on the operation input made in the explaining mode and the machine status; and a presentation unit configured to present the presentation content decided by the decision unit.

Furthermore, according to another aspect of the present invention, there is provided an information processing apparatus having the action modes, including an operating mode for performing an operation on the apparatus and an explaining mode for presenting an explanation corresponding to the operation on the apparatus, comprising: a status acquisition unit configured to acquire a machine status of the information processing apparatus at the time of movement to the explaining mode; a vocabulary acquisition unit configured to acquire the vocabulary capable of voice input based on the machine status acquired by the status acquisition unit when an operation part for voice input is operated in the operating mode; and a presentation unit configured to present the explanation including the vocabulary acquired by the vocabulary acquisition unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A to 2D are views showing one example of the action of the information processing apparatus according to the embodiment.

FIGS. 3A and 3B are views showing one example of the action of the information processing apparatus according to the embodiment.

FIGS. 4A to 4D are views showing one example of the action of the information processing apparatus according to the embodiment.

FIGS. 5A to 5E are views showing one example of the action of the information processing apparatus according to the embodiment.

FIGS. 6A to 6F are views showing one example of the action of the information processing apparatus according to the embodiment.

DETAILED DESCRIPTION OF THE PREFERRED EMBODIMENTS

Preferred embodiments of the present invention will now be described in detail in accordance with the accompanying drawings.

Figure 1:
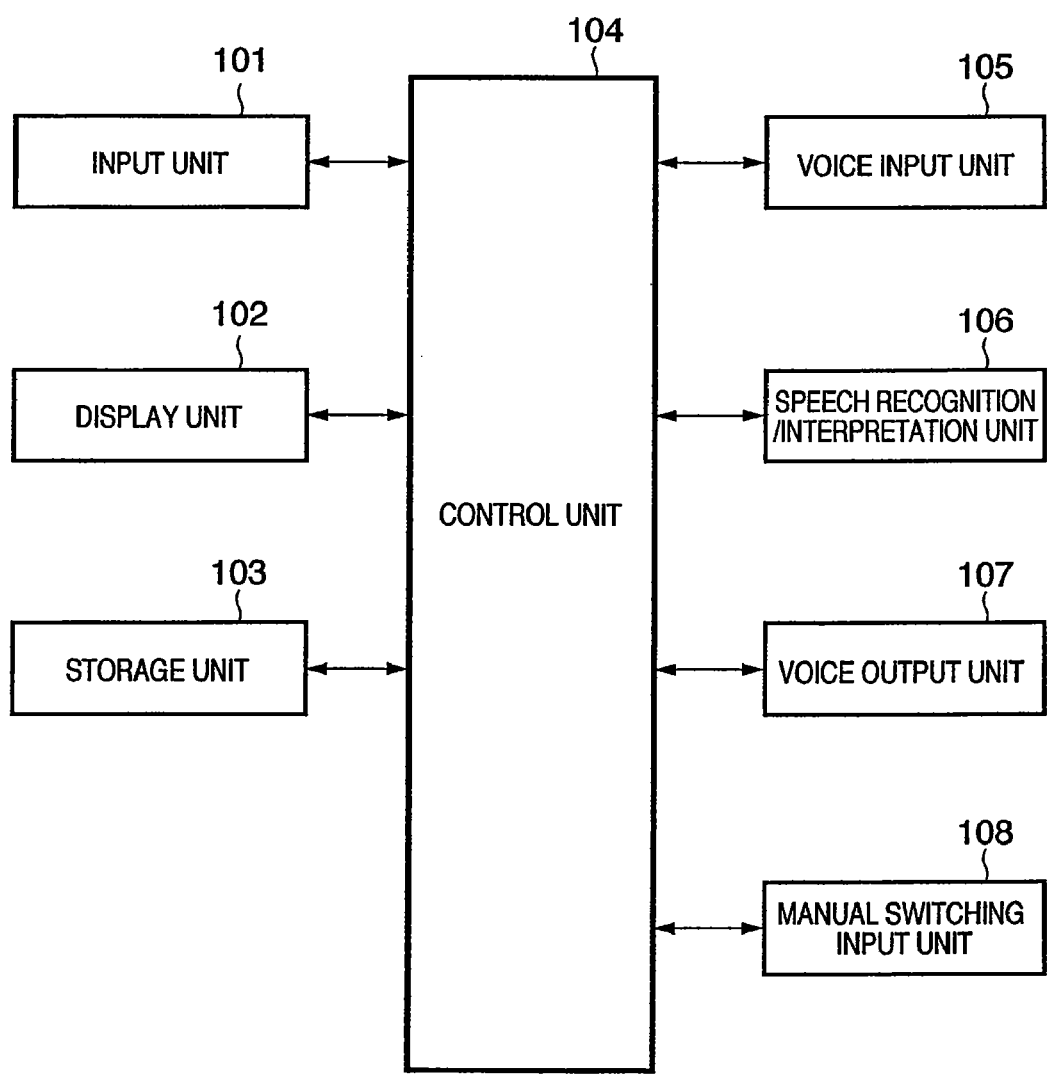
FIG. 1 is a diagram showing the basic configuration of an information processing apparatus according to an embodiment of the present invention.

FIG. 1 is a block diagram showing the basic configuration of an interface device according to this embodiment. The interface device of this embodiment can be employed as a user interface for various information processing apparatuses, but in this embodiment, the interface device is applied to a copying machine. As shown in FIG. 1, the interface device comprises an input unit 101, a display unit 102, a storage unit 103, a control unit 104, a voice input unit 105, a speech recognition/interpretation unit 106, a voice output unit 107 and a manual switching input unit 108.

The input unit 101 comprises input device such as a group of buttons, a keyboard, a mouse, a touch panel, a pen, or a tablet, and functions as an input interface for inputting various instructions into the apparatus. The display unit 102 is composed of a display unit such as a liquid crystal display, which displays various kinds of information with the images and characters. The display unit 102 may be a touch panel type display unit. In this case, the display unit 102 has a function as the input unit 101 (function of inputting various kinds of instruction into the apparatus).

The storage unit 103 comprises a hard disk drive unit for storing various kinds of information, and a drive unit accessible to the storage medium such as a CD-ROM or a DVD-ROM to provide various kinds of information to the information processing system. The storage unit 103 stores various application programs, a user interface control program, and various kinds of data required to execute each program. And these programs or data are read into this apparatus under the control of the control unit 104, as required. The control unit 104 has a work memory, a CPU or an MPU, and performs various kinds of processing by reading the program or data stored in the storage unit 103.

The voice input unit 105 comprises a microphone or an A/D converter to input the voice of the user. The speech recognition/interpretation unit 106 makes the speech recognition for the voice inputted by the voice input unit 105. The well known speech recognition techniques may be employed. The voice output unit 107 comprises a speaker, a headphone, and a D/A converter, and outputs the voice based on the data obtained from an audio file or through the speech synthesis process under the control of the control unit 104. More specifically, the voice output unit 107 reproduces and outputs a WAV file, for example. Alternatively, the voice output unit 107 may create the synthesized voice data from the read text, perform the D/A conversion, and output the sound to the outside. The well known speech synthesis techniques may be employed.

The manual switching input unit 108 is an input device such as a dial or slide switch. The manual switching input unit 108 has a characteristic that it is not automatically restored to the original status (e.g., status before the dial is revolved by one graduation, or status before the slide switch is moved to the right or left by one graduation). The manual switching input unit 108 functions as an input interface for inputting various kinds of instruction into this apparatus by the manual operation of the user.

FIGS. 2A to 2D show one example of the action of a printer and the user interface according to this embodiment. In FIGS. 2A to 2D, the user interface of this embodiment is applied to the copying machine, that is, the copying machine is employed as the information processing apparatus. In FIGS. 2A to 2D, the user interface 201 (hereinafter referred to as UI 201) is composed of the input unit 101 and the display unit 102. In the UT 201, reference sign 201A designates a display (display unit 102). The icons of "number of copies", "paper" and "magnification" are displayed on the display 201A, with the focus on the "number of copies".

Reference sign 201B designates a mode switching button (input unit 101) for switching the action mode of the apparatus by depressing this button. The action modes of this apparatus include the "operating mode" (mode in which the apparatus is operated (the action is instructed)) and the "HELP mode" (mode in which the operation explanation of the apparatus is made).

The function allocated to each switch (201C to 201F) of the input unit 101 where the action mode is the "operating mode" will be described below. Reference sign 201C designates a left arrow button for shifting the focus on the display 201A to the left icon by depressing this button. Reference sign 201D designates a settling button for settles a choice of the icon focused on the display 201A by depressing this button. Reference sign 201E designates a right arrow button for shifting the focus on the display 201A to the right icon by depressing this button. Reference sign 201F designates a voice button for starting to pick up the voice after depressing the button. That is, if the user makes voice after depressing the voice button 201F, the voice is taken into the apparatus by the voice input unit 105. If the voice is taken from the voice input unit 105, the voice is recognized and interpreted by the speech recognition/interpretation unit 106, and processed in accordance with the recognition result (e.g., if "paper" is inputted by voice, a choice of the "paper" icon is settled).

Next, an action example when the acting mode of the information processing apparatus is the "operating mode" will be described below. If the right arrow button 201E is depressed when this apparatus is in the status 201, the focus is shifted to the right icon. As a result, the focus shifts from "number of copies" to "paper", as shown in FIGS. 2A and 2B. If the settling button 201D is depressed, the choice of the icon focused is decided. For example, if the settling button 201D is depressed in the status of FIG. 2B, the choice of the "paper" icon is decided, and a paper selection screen appears on the display 201A, as shown in FIG. 2D.

Figure 2C:
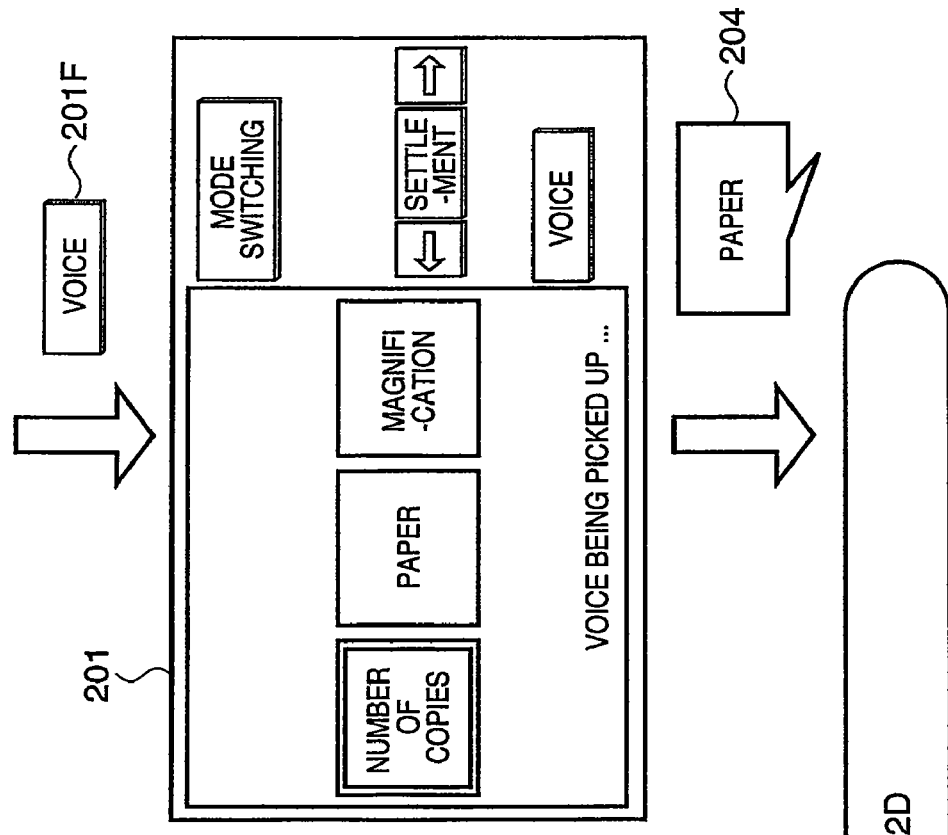
Figure 2B:
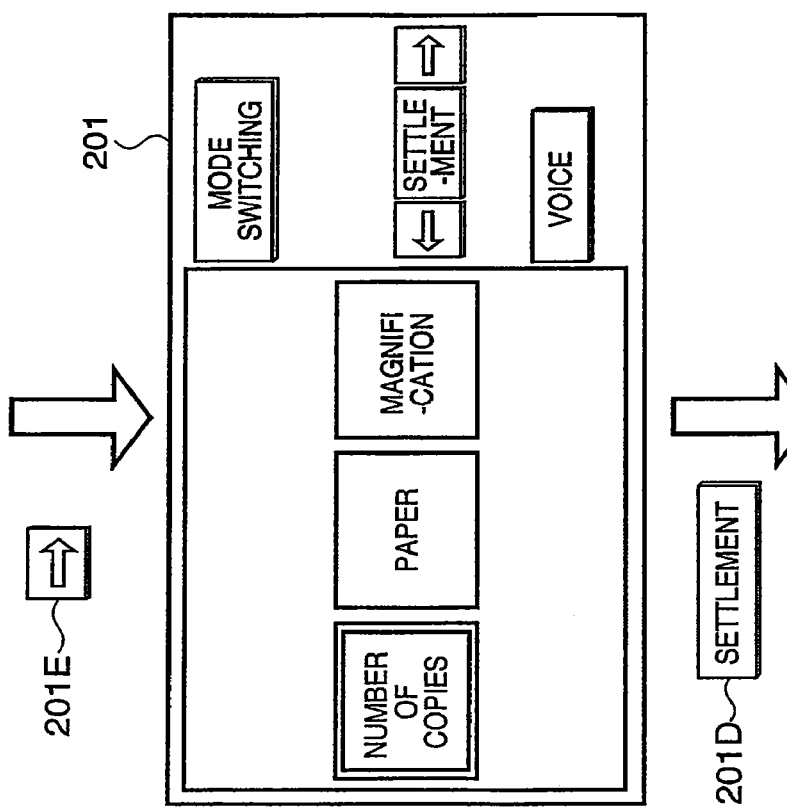
Figure 2D:
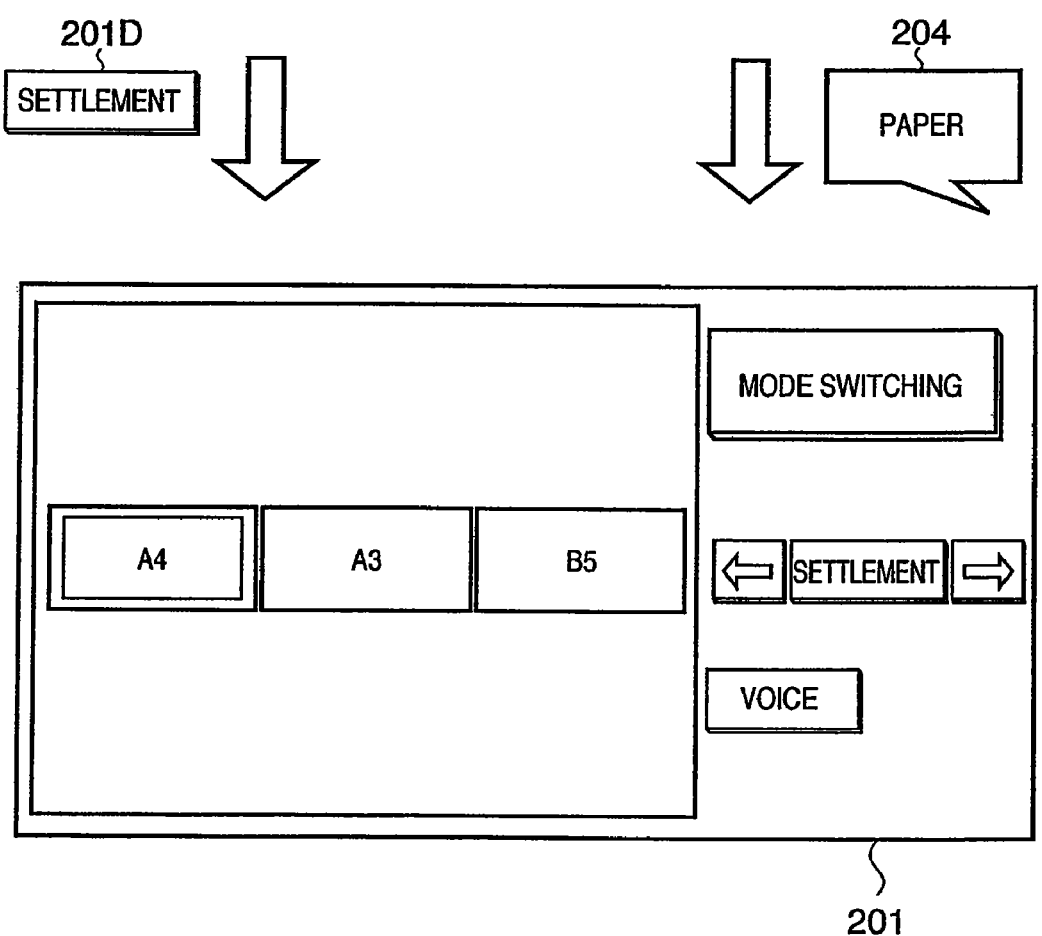

Also, if the voice button 201F is depressed when the apparatus is in the status of FIG. 2A, the "voice being picked up" is clearly stated, as shown in FIG. 2C, and picking up the voice is started. If the voice (204) of "paper" is inputted by the user, the voice is recognized and interpreted by the speech recognition/interpretation unit 106, with the result that the choice of the "paper" icon is decided. As a result, the paper selection screen appears on the display 201A (205).

Next, the operation when the action mode of apparatus is switched from the "operating mode" to the "HELP mode" by operating the mode switching button 201B will be described below. FIGS. 3A and 3B are views for explaining the presentation state of the UI 201 in switching from the operating mode to the Help mode. If the mode switching button 201B is depressed in the status of the "operating mode" as shown in FIG. 3A, the operating mode is switched to the "HELP mode" as shown in FIG. 3B. In this case, an indication 301 for informing the user of the "HELP mode" appears on the display 201A. For example, the "HELP mode" is clearly stated as shown in FIG. 3B. Of course, the characters of "HELP" only or another symbol may be displayed. Alternatively, various variations may be made, for example, by changing the background color of the display 201A. At this time, a predetermined voice output may be made from the voice output unit 107. For example, the voice of "HELP mode" is outputted (302), as shown in FIG. 3B.

Next, an action example when the action mode of the printer is the "HELP mode" will be described below. If an operation is performed in the "HELP mode", the explanation of "the apparatus changes to this status by performing the operation" is presented to the user. For example, the screen status after the operation is displayed on the display 201A, and a situation after the operation is outputted by voice from the voice output unit 107. Also, if an operation of enabling the voice input (depressing the voice button 201F in this embodiment) is performed in the "HELP mode", the vocabulary capable of voice input is presented to the user.

As for the voice output, a voice file (WAV file) for explanation is stored beforehand for each status in the storage unit 103, and outputted (reproduced) from the voice output unit 107 by designating the file according to the machine status at that time and the operation content. Alternatively, when the speech synthesis is employed, the text for explanation is stored beforehand for each status in the storage unit 103, and outputted from the voice output unit 107 by designating the file according to the machine status. In this case, the existent speech synthesis techniques may be employed.

After presentation, the user selects either "Performing this operation" or "Returning to the operation" ("Performing this operation" is selected by depressing the settling button 201D, or "Returning to the operation" is selected by depressing the mode switching button 201B), and transits to the next process. If the "Performing this operation" is selected (the settling button 201D is depressed), the operation content as explained is performed and the printer returns to the "operating mode". Also, if the "Returning to the operation" is selected (the mode switching button 201B is depressed), the operation is not performed, and the printer returns to the status before switching from the "operating mode" to the "HELP mode".

Figure 4C:
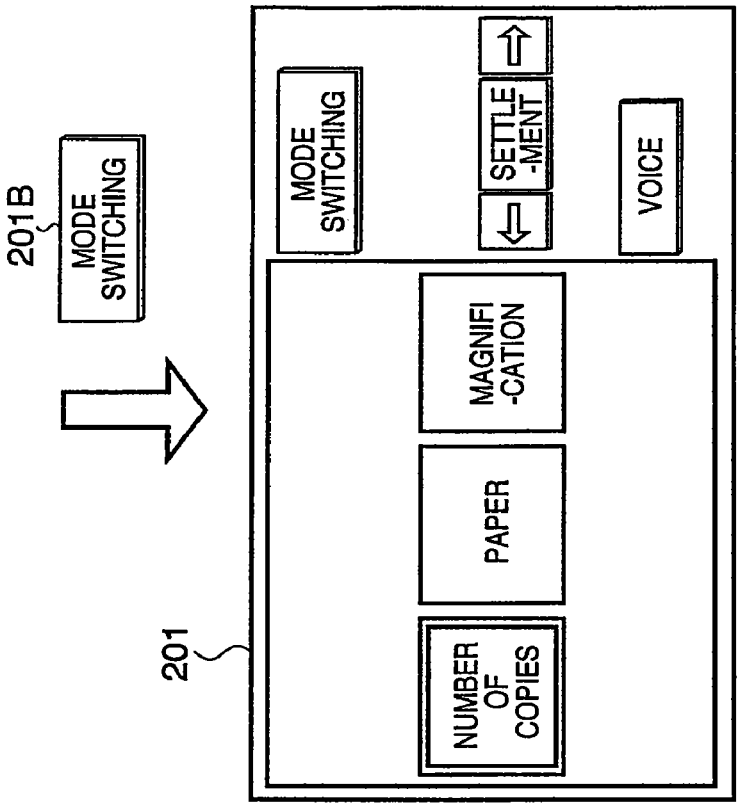
Figure 4D:
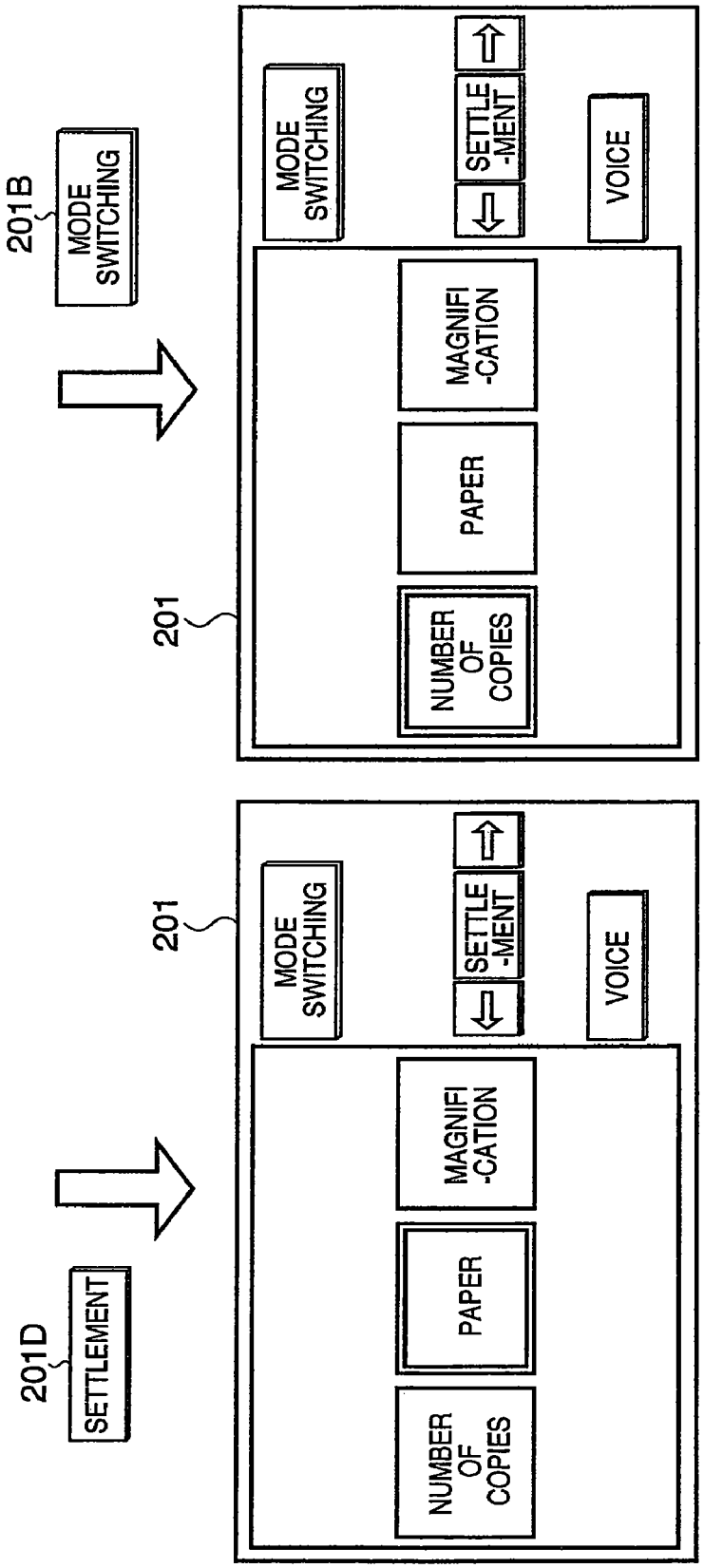

FIGS. 4A to 4D are views showing an action example of the UI 201 in the HELP mode. In the state of FIG. 4A, the "HELP mode" (301) is displayed on the display 201A, indicating that the apparatus is operating in the HELP mode. Herein, if the right arrow button 201E is depressed, the focus is shifted to the right adjacent icon "paper" on the display 201A, as shown in FIG. 4B. At this time, a voice of "Shifting the focus to the paper" (401) is outputted. That is, a guidance for the depressing operation of the right arrow button 201E is not simply "Shifting the focus to the right adjacent icon", but to which icon the focus is shifted in accordance with the current focus position (machine status) is expressly notified. If the settling button 201D is depressed in the state of FIG. 4B, the "Performing this operation" is selected. Hence, the apparatus makes a movement from the "HELP mode" to the "operating mode", with the focus on the "paper" icon, as shown in FIG. 4C. Also, if the mode switching button 201B is depressed in the state of FIG. 4B, the "Returning to the operation" is selected. In this case, the apparatus returns to the status at the time of movement to the "HELP mode" (status where the focus is on the number of copies icon), and makes a movement to the "operating mode", as shown in FIG. 4D.

Figure 5A:
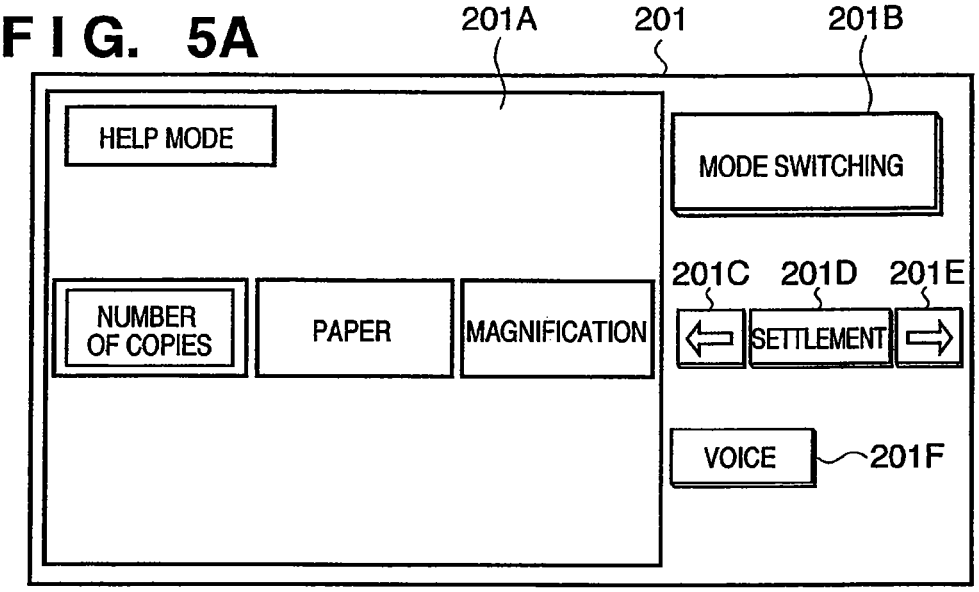
Figure 5B:
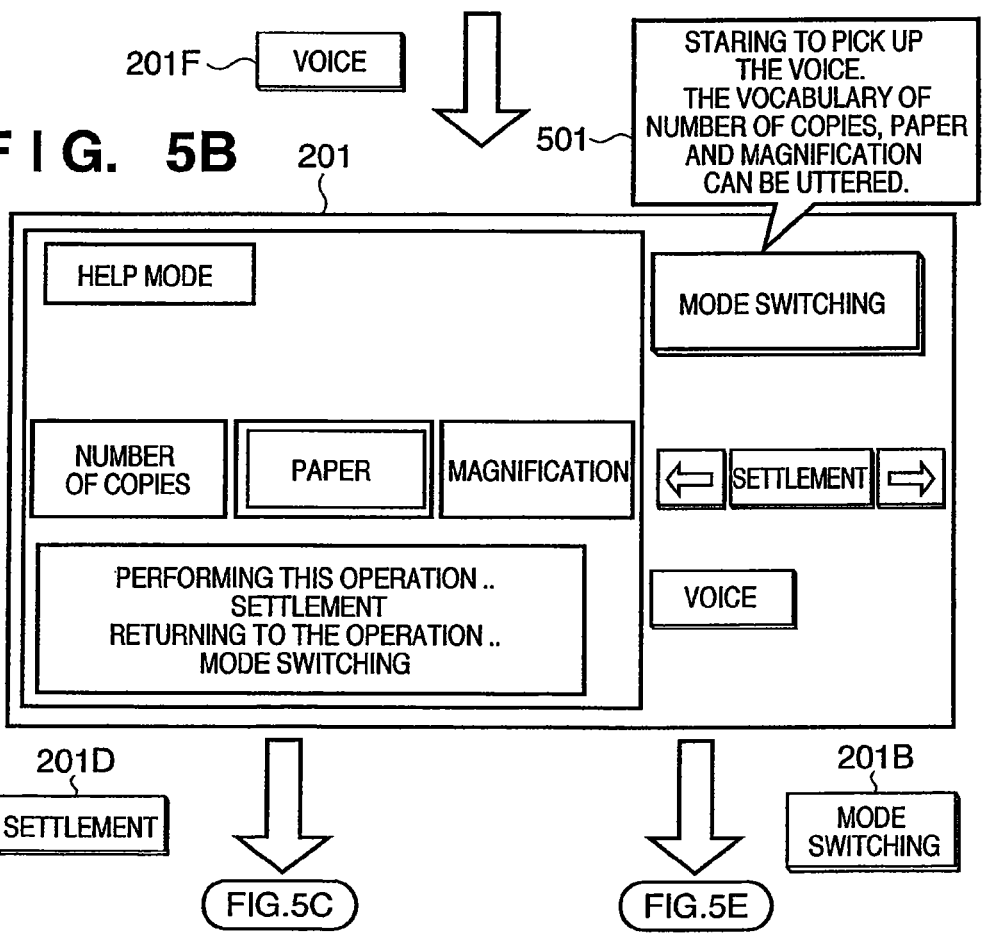

FIGS. 5A to 5E are views showing another action example of the UI 201 in the "HELP mode". In FIGS. 5A to 5E, the presentation examples of guidance for the voice button 201F for voice input are illustrated. In the state of FIG. 5A, the "HELP mode" (301) is displayed on the display 201A, indicating that the apparatus is operating in the "HELP mode". Herein, if the voice button 201F is depressed, the guidance for voice input is outputted by voice. In this case, it is not simply informed that the voice input is enabled, but the guidance including the vocabulary capable of voice input in the status of the UI at that time is made. For example, a voice guidance of "Starting to pick up the voice. The vocabulary of the number of copies, paper and magnification can be uttered" (501) is made, as shown in FIG. 5B.

Figure 5D:
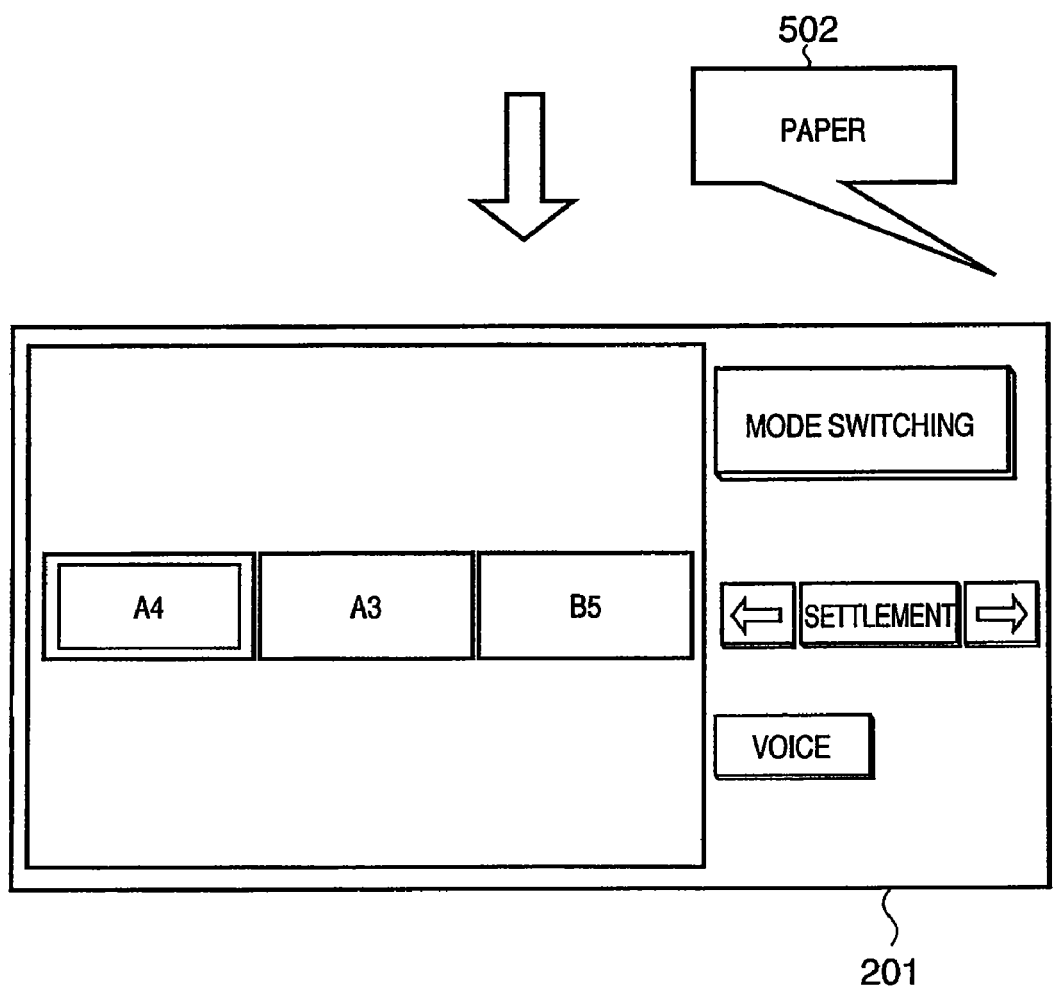

If the settling button 201D is depressed in the state of FIG. 5B, the "Performing this operation" is selected. Hence, the apparatus makes a movement from the HELP mode to the operating mode, whereby the voice is being picked up, as shown in FIG. 5C. And if the voice input 502 of "paper" is made, the choice of paper icon is settled in the state as shown in FIG. 5D. Also, if the mode switching button 201B is depressed in the state of FIG. 5B, the "Returning to the operation" is selected. In this case, the apparatus makes a movement to the operating mode in the status at the time of movement to the HELP mode (status of focusing on the number of copies icon), as shown in FIG. 5E.

FIGS. 6A to 6F are views showing still another action example in the "HELP mode", in which the UI comprises the manual switching input unit 108, unlike the UI as shown in FIGS. 3A to 5E. In FIGS. 6A to 6F, an action example is illustrated in the case of presenting the help concerning the operation of the manual switching input unit 108 that is not automatically restored to the original state. In the UI 601 of FIGS. 6A to 6F, the display 601A, the mode switching button 601B, and the settling button 601D have the same functions as 201A, 201B and 201D as shown in FIGS. 4A to 4D and FIGS. 5A to 5E. The UI 601 has a dial 601C of rotary switch as the manual switching input unit 108. With this dial 601C, the user can switch the form of displaying the images stored in the storage unit 103 on the display 601A, whether the images may be displayed one by one or in a list.

If the mode switching button 601B is depressed in the display state as shown in FIG. 6A, the action mode moves to the "HELP mode" to become in the state of FIG. 6B. The display 602 indicating the "HELP mode" appears on the display 601A. If the dial 601C is revolved to be aligned with the "List" in this state, the display form on the display 601A becomes the list display, and its function (displaying the list of images) is explained by the voice 603. If the settling button 201D is depressed in this state, the operation status at that time is kept and the apparatus makes a movement to the "operating mode", as shown in FIG. 6D.

On the other hand, if the mode switching button 601B is depressed, a message 604 of restoring the dial 601C is displayed on the display 601A, because the status of the dial 601C is not automatically restored (by software). At this time, the status to which the dial 601C is restored (restored to "one by one" in FIG. 6E) is clearly pointed out. The effect is as follows. That is, since one of two functions is selected by the dial in FIG. 6E, the user is not confused in the operation. However, if one of three or more functions is selected, the user is at a loss to which position to restore the dial. In this embodiment, since the return position is clearly indicated, the user is not confused in this way. Thus, if the dial 601C is restored to the status at the time of movement to the "HELP mode", the apparatus makes a movement to the "operating mode".

Figure 7A:
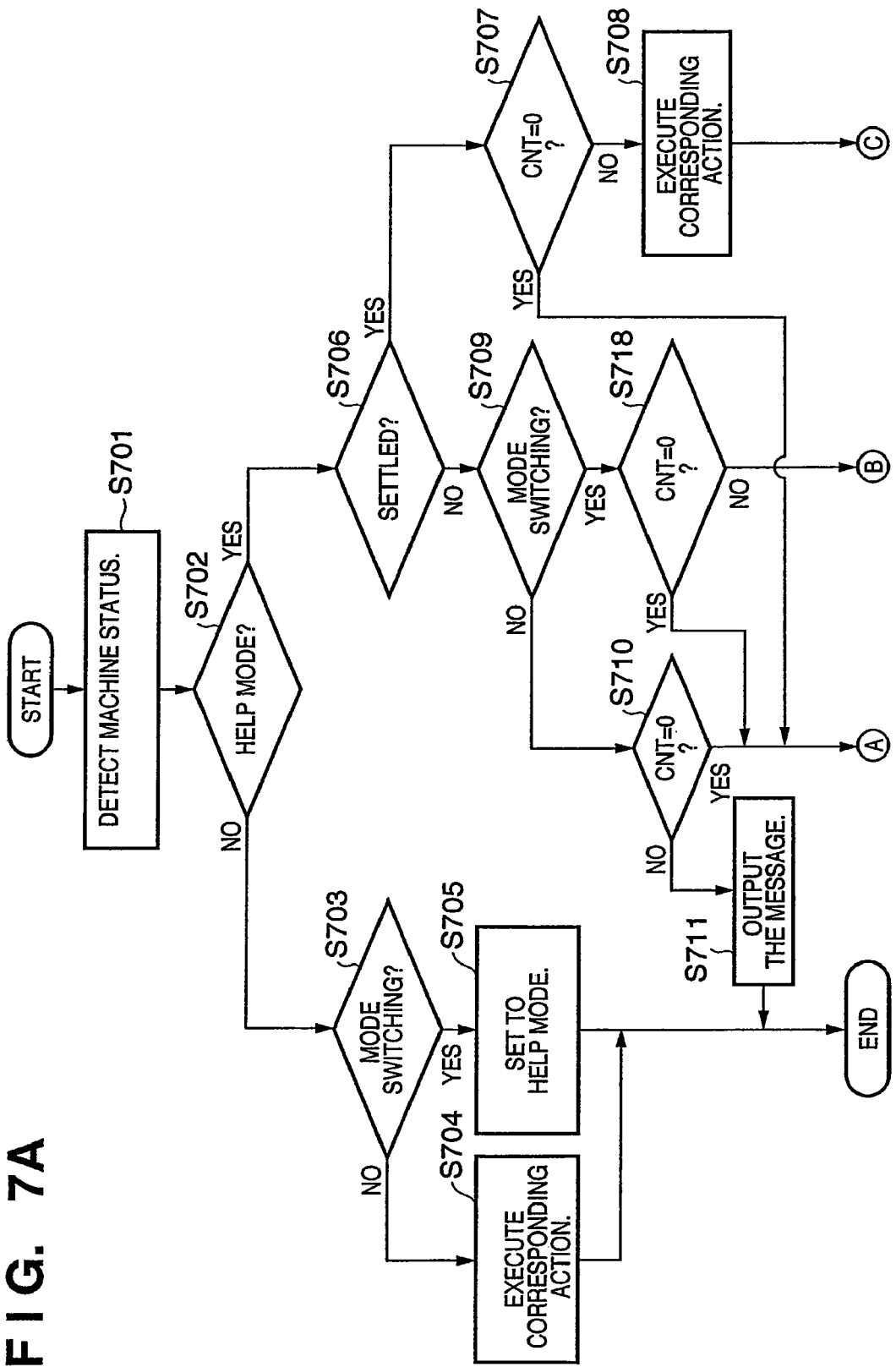
FIGS. 7A and 7B are flowcharts showing an action procedure of the information processing apparatus according to the embodiment.
Figure 7B:
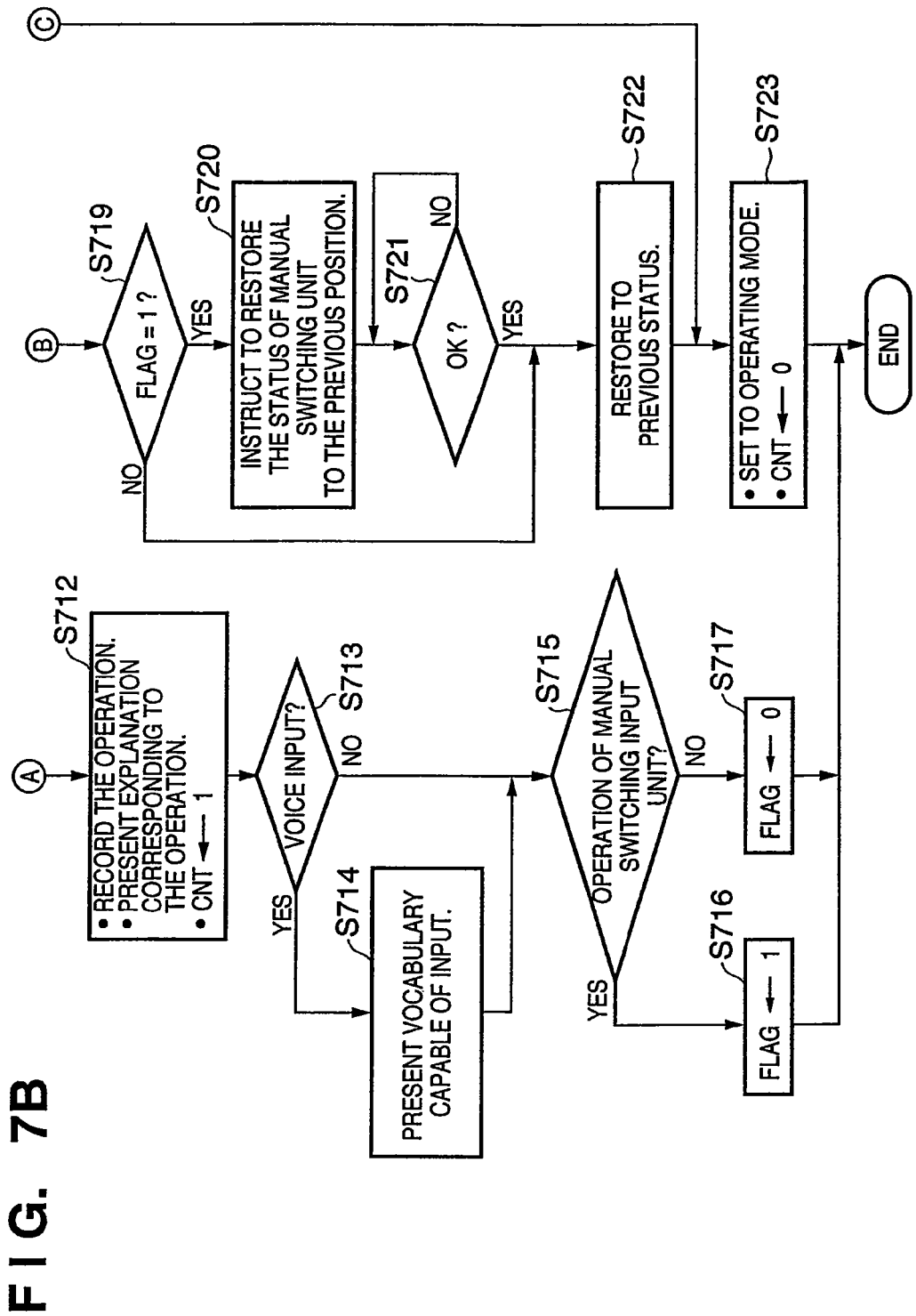

Referring to the flowcharts of FIGS. 7A and 7B, the UI control as explained with reference to FIGS. 4A to 6F will be described below in more detail. FIGS. 7A and 7B are flowcharts for explaining an action procedure of the information processing apparatus when an operation of the user is detected.

If the operation of the user is detected, the machine status is detected at step S701. Then, it is checked whether or not the action mode is the "HELP mode". If the action mode is the "operating mode", the procedure goes to step S703, or if the action mode is the "HELP mode", the procedure goes to step S706.

The steps S703 to S705 are performed when the action mode is the "operating mode". If it is checked that the operation of the user is "depressing the mode switching button 201B" at step S703, the procedure goes to step S705, where the action mode is set to the "HELP mode". Also, if it is checked that the operation of the user is other than the operation of "depressing the mode switching button 201B" at step S703, the procedure goes to step S704, where the action corresponding to the operation is performed. The action corresponding to the operation means shifting the focus to the right icon, when the right arrow button 201E is depressed, for example.

The steps S706 to S723 are performed when the action mode is the "HELP mode". If it is checked that the operation of the user is the "depressing the settling button 201D" at step S706, the procedure goes to step S707. Also, if the operation of the user is not the "depressing the settling button 201D", the procedure goes to step S709.

At step S707, it is checked whether or not the CNT value is zero. Herein, the CNT is a variable indicating whether or not the explanation is presented to the user after movement to the "HELP mode". If no explanation is presented to the user after movement to the "HELP mode", the CNT is equal to zero, or otherwise, the CNT is equal to 1. The value of CNT is set to zero in the initial state, namely, immediately after movement to the "HELP mode".

If the CNT is equal to zero (no explanation is presented) at step S707, the procedure goes to step S712 to explain the function of the settling button. For example, if the settling button 201D is depressed in the state of FIG. 4A, the voice guidance of "Presenting a screen for setting the number of copies" is outputted, whereby the screen for setting the number of copies (not shown) appears on the display 201A. And its operation content is stored in the storage unit 103, and the CNT is set to 1. On the other hand, if the CNT is equal to 1 (the explanation is already presented) at step S707, the procedure goes to step S708. At step S708, the operation of the user stored in the storage unit 103 (the operation of the user recorded in the storage unit 103 at step S712) is read, and the action corresponding to the operation is executed. The action corresponding to the operation is a processing of shifting the focus to the right position when the right arrow button 201E is depressed, for example. Also, if the settling button 201D is depressed, its settling operation (e.g., movement to setting the number of copies) is performed. If the corresponding action is executed at step S708, the action mode is set to the "operating mode", and the value of CNT is made zero at step S723.

On the other hand, if it is checked that the operation of the user is not the "depressing the settling button 201D", the procedure goes from step S706 to step S709, where it is checked whether or not the operation is the "depressing the mode switching button 201B". If the operation of the user is the "depressing the mode switching button 201B" at step S709, the procedure goes to step S718. If the CNT is equal to zero (no explanation is presented yet) at step S718, the procedure goes to step S712 to explain the function of the mode switching button. The processing where the CNT is equal to 1 (movement to step S719) at step S718 will be described later.

If it is checked that the operation of the user is not the "depressing the mode switching button 201B at step S709, the procedure goes to step S710. If the CNT is equal to 1 (the explanation is already presented) at step S710, the operation after presenting the explanation is neither the "depressing the settling button 201D" nor the "depressing the mode switching button 201B". Accordingly, the procedure goes to step S711 to output a message of selecting either the settling button 201D or the mode switching button 201B. On the other hand, if the CNT is equal to zero (no explanation is presented yet) at step S710, the procedure goes to step S712.

At step S712, the operation of the user inputted at this time is recorded in the storage unit 103, the explanation corresponding to the operation is presented, the display content is updated in accordance with the operation, and the value of CNT is set to 1. For example, if step S712 is performed due to YES branch at step S707, the function explanation of the settling button is presented as described above. If step S712 is performed due to YES branch at step S718, the function explanation of the mode switching button is presented. Also, if step S712 is performed due to YES branch at step S710, the function explanation corresponding to the operation content is presented. As previously described, the explanation of "the apparatus changes to this status by performing the operation" is presented to the user. As a way of presenting the explanation, the screen status after the operation is displayed on the display 201A, or a situation after the operation is outputted by voice from the voice output unit 107 (FIG. 4B). Either one of a change in the screen status and the voice output may be made.

Also, if the voice input is enabled by the operation (e.g., the voice button 201F is depressed as shown in FIGS. 5A and 5B), the procedure goes from step S713 to step S714, where the vocabulary capable of voice input is presented according to the machine status at that time. The above vocabulary capable of voice input, like the explanation sentence, is stored beforehand in the storage unit 103. Update of the display, or registration and selection of the voice content to be outputted will be described later with reference to FIG. 8.

Also, if the operation of the user is the operation for the manual switching input unit 108 that is not automatically restored to the original status, such as revolving the dial 601C, the procedure goes from step S715 to step S716, where the value of FLAG is set to 1. On the other hand, if any other operation is performed, the procedure goes to step S717, where the FLAG is set to zero. That is, the FLAG indicates the presence or absence of the operation for the manual switching input unit 108.

By the way, if it is checked that the CNT is equal to 1 at step S718, this is a case where the mode switching is instructed after the explanation is presented. In this case, the apparatus is restored to the status immediately before movement to the "HELP mode", and makes a movement to the "operating mode", as in FIGS. 4D and 5E. Also, after confirming that the dial is restored to the status immediately before movement to the "HELP mode", the apparatus makes a movement to the "operating mode", as shown in FIGS. 6E and 6F. These processings are performed at steps S719 to S723.

If the FLAG is equal to 1 at step S719, it is indicated that the operation for the manual switching input unit 108 that is not automatically restored to the original status is performed. Hence, the procedure goes to step S720 to instruct that the status of the manual switching input unit 108 is restored to the original position. For example, a message as shown in FIG. 6E is displayed on the display 201A, or outputted by voice from the voice output unit 107. Thereafter, if it is confirmed at step S721 that the status of the manual switching input unit 108 is restored to the status at the time of movement to the "HELP mode", the procedure goes to step S722. Also, if the FLAG is equal to zero (no operation for the manual switching input unit 108 is performed) at step S719, the procedure directly goes to step S722. The machine status is returned to the status before movement to the "HELP mode" at step S722. The "operating mode" is set as the action mode, and the value of CNT is set to zero at step S723.

Figure 8:
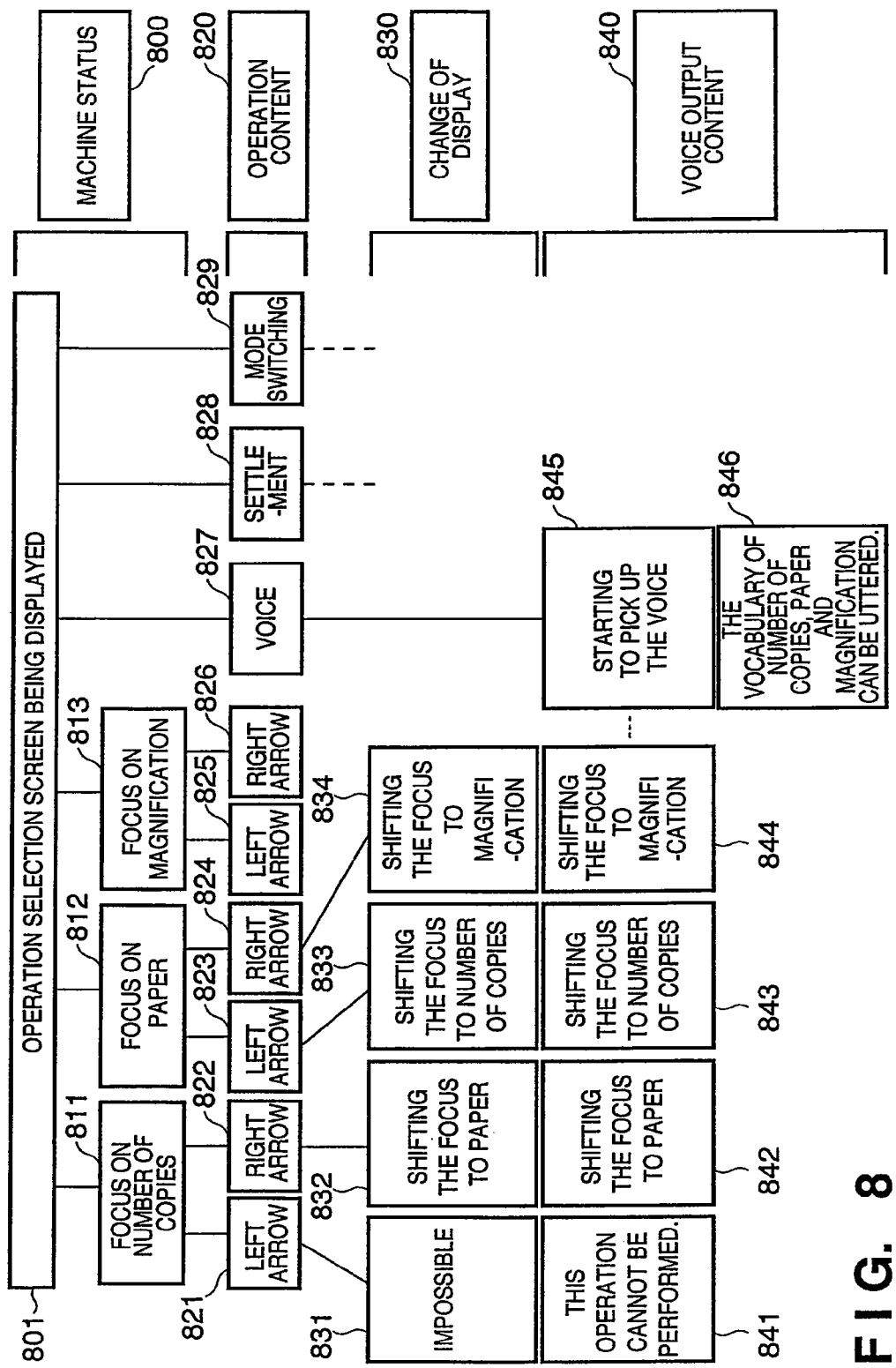
FIG. 8 is a diagram for explaining a registration status example of the output contents for help presentation according to this embodiment.

FIG. 8 is a diagram for explaining a registration state example of the output contents for help presentation according to this embodiment. In FIG. 8, the registration state of help output content is shown when the operation selection screen is displayed as shown in FIG. 4A. The content as indicated at 801, 811 to 813 represents the machine status 800, and is decided depending on the machine status detected at step S701. Also, 821 to 829 represent the operation content 820 performed in the "HELP mode". 831 to 834 represent how to change the display (display 201A, 601A) of the UI corresponding to the machine status and the operation content. Also, 841 to 846 represent the voice output content 840 corresponding to the machine status and the operation content. For example, if the operation is in the state of FIG. 4A, "the operation selection screen is being displayed" (801), with the "focus on the number of copies" (811). Hence, if the right arrow 201E is depressed in this status, the apparatus leads through 811 and 822 to a display change content 832. Accordingly, the "Shifting the focus to the paper" is performed on the display of the UI, so that the display is changed as shown in FIG. 4B. Also, 842 is associated with the voice output content, whereby the voice guidance of "Shifting the focus to the paper" including the operation result is outputted. The voice output content may be kept in the file format of WAV and reproduced and outputted, or kept in the text format and outputted by voice through the speech synthesis, as described above.

Also, if the voice button 201F is operated, the voice output content 845 is outputted at step S712, and the voice output content 846 is outputted at step S714. In particular, the output content 846 is specialized to the operation selection screen, and if another screen is displayed on the display 201A, its content is different. For example, if the voice button 201F is depressed after movement to the "HELP mode" in the state of FIG. 2D, the guidance of "Starting to pick up the voice", "The vocabulary of A4, A3, B5 can be uttered." is reproduced.

As described above, the registration of output content as shown in FIG. 8 is owned for each screen, whereby the appropriate help display and voice output are enabled.

Next, the correspondence between the action as shown in FIGS. 4A to 6F and the process as shown in the above flowcharts will be described below.

If the right arrow button 201E is depressed when the apparatus is in the state as shown in FIG. 4A, the apparatus makes a movement to the state as shown in FIG. 4B. That is, the state where the focus is shifted to the paper is displayed on the display 201A, and the voice of "Shifting the focus to the paper" is outputted (steps S702 to S706 to S709 to S710 to S712). Herein, if the settling button 201D is depressed, its operation is performed and the apparatus returns to the "operating mode" (steps S702 to S706 to S707 to S708 to S723). That is, the apparatus makes a movement to the "operating mode" by shifting the focus to the paper icon (FIG. 4C).

Also, if the mode switching button 201B is depressed when the apparatus is in the state as shown in FIG. 4B, the apparatus returns to the "operating mode" without performing the operation (steps S702 to S706 to S709 to S718 to S719 to S722 to S723). That is, the focus is kept on the number of copies icon.

Also, if the voice button 201F is depressed when the apparatus is in the state as shown in FIG. 5A, the apparatus becomes in the state as shown in FIG. 5B, where the "Starting to pick up the voice. The vocabulary of the number of copies, paper and magnification can be uttered." is outputted by voice (step S714). At this time, the vocabulary that can be uttered may be displayed on the display 201A. Subsequently, if the settling button 201D is depressed, its operation is performed and the apparatus returns to the "operating mode" (steps S706 to S707 to S708 to S723). That is, picking up the voice is started (FIG. 5C). Subsequently, if the voice 501 of "paper" is inputted from the voice input unit 105 by the user, for example, the voice is recognized and interpreted by the speech recognition/interpretation unit 106, so that the choice of paper icon is decided (step S704). As a result, the paper selection screen appears on the display 201A (FIG. 5D).

Also, if the mode switching button 201B is depressed when the apparatus is in the state as shown in FIG. 5B, the apparatus returns to the "operating mode" without performing the operation (steps S722, S723). That is, the apparatus returns to the original status without starting to pick up the voice (FIG. 5E).

In the flowcharts of FIGS. 7A and 7B, steps S715 to S717, and S719 to S721 are performed when the manual switching input unit 108 is operated in the "HELP mode". That is, when the manual switching input unit 108 that is not automatically restored to the original status is operated in the "HELP mode", the explanation for the operation is presented, and the apparatus returns to the "operating mode" without performing the operation, the manual switching input unit 108 is restored to the original status.

In FIG. 6A, one image is displayed on the display 201A. If the mode switching button 201B is depressed in this state, the apparatus makes a movement from the "operating mode" to the "HELP mode", resulting in the state of FIG. 6B. If the dial 601A is revolved and aligned with the list display in the "HELP mode", the list of images is displayed on the display 201A as shown in FIG. 6C, and the voice 602 of "Displaying the list of images" is outputted (step S712).

If the settling button 201D is depressed in the state as shown in FIG. 6C, the apparatus returns to the "operating mode" by performing the operation (steps S706 to S707 to S708 to S723). That is, the list of images is displayed (FIG. 6D).

Also, if the mode switching button 201B is depressed in the state as shown in FIG. 6C, the user is prompted to restore the revolved dial 601A to the original status (FIG. 6E, S720). Thereafter, if it is detected that the dial 601A is restored to the original position, the apparatus returns to the original status (where the images are displayed one by one), and makes a movement to the "operating mode" (steps S721 to S722 to S723, FIG. 6F).

As described above, with this embodiment, if the operation is performed in the "HELP mode", the explanation of "the apparatus changes to this status by performing the operation" is presented to the user, whereby the help can be easily understood by the user. Also, when the voice input is enabled by the operation, the vocabulary capable of voice input is presented to the user, and more convenient for the user.

In the "HELP mode", when the manual switching input unit 108 that is not automatically restored to the original status is operated, the explanation for the operation is presented, and the apparatus is restored to the "operating mode" without performing the operation, the configuration of this embodiment is also effective. That is, in the "HELP mode", if the manual switching input unit 108 is operated, the help is presented, and then the mode switching button 201B is depressed, an indication for prompting the user to restore the manual switching input unit 108 to the original status (specifically including to which status the manual switching input unit is restored) is displayed. Therefore, the status of the manual switching input unit 108 and the internal status of the apparatus can be easily maintained identical by the operation in the "HELP mode".

As described above, with this embodiment, it is possible to provide the user with the operation explanation that is easy to use and understand, concerning the complicate user interface for the apparatus, by considering the voice input UI and the hardware status. Since the operation explanation is presented according to the situation of the apparatus, it is easy for the user to understand the operation explanation, and a sense of safety on the operation can be provided.

For example, since the operation content in which the explanation is presented in the "HELP mode" by one operation of the settling button 201D, 601D is executed, and the apparatus makes a movement to the "operating mode", the mode movement and the operation execution can be effected collectively, whereby the operability is improved. Further, it is possible to return to the "operating mode" as the status immediately before movement to the "HELP mode" by the mode switching button 201B, 601B. That is, the user can selectively perform two kinds of ways for returning to the "operating mode", whereby the operability is improved.

In returning to the "operating mode" by the mode switching button 601D, the operation status of the manual switching input unit 108 (dial switch 601C) in the "HELP mode" is checked. And when the manual switching input unit 108 is operated, the user is prompted to restore the manual switching input unit 108 to the status immediately before movement to the "HELP mode". Therefore, it is possible to avoid inconsistency between the internal machine status and the status of the manual switching input unit 108 in returning to the "operating mode".

Also, with this embodiment, when the machine status is acquired at the time of movement to the "HELP mode", and the explanation corresponding to the operation input is presented, which status the apparatus gets in as a result of operation is presented, whereby the more appropriate explanation is provided to the user. For example, when the focus is shifted to the "paper" icon by operating the right arrow button 201E, the specific explanation of "Shifting the focus to the paper" is provided. Further, if the voice button 201F is operated in the "HELP mode", what vocabulary can be inputted by voice is presented based on the acquired machine status. For example, if the voice button 201F is operated in the machine status as shown in FIG. 5, it is notified that the vocabulary of "number of copies, paper, magnification" can be inputted by voice. Therefore, the user friendliness is enhanced.

Needless to say, the object of the invention may be achieved by supplying a storage medium storing the program code of software for implementing the functions of the embodiment to the system or apparatus, and enabling a computer (or CPU or MPU) of the system or apparatus to read and execute the program code stored in the storage medium.

In this case, the program code itself read from the storage medium may implement the functions of the embodiment, and the storage medium storing the program code may constitute the invention.

The storage medium for supplying the program code may be a flexible disk, a hard disk, an optical disk, an optical magnetic disk, a CD-ROM, a CD-R, a magnetic tape, a non-volatile memory card, or a ROM, for example.

Also, the functions of the embodiment may be implemented by executing the program code read by the computer, or enabling the OS (Operating System) working on the computer to perform a part or all of the actual process, based on instructions of the program code.

Moreover, the functions of the embodiment may be also implemented through the processing of the CPU provided for a function extension board or a function extension unit to perform a part or all of the actual process, based on instructions of the program code, after the program code read from the storage medium is written into a memory provided for the function extension board inserted into the computer or the function extension unit connected to the computer.

With the invention, the operability is improved in the user interface having the operation guidance function.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-107743, filed on Apr. 4, 2005, which is hereby incorporated by reference herein in its entirety.

What is claimed is:

1. An information processing apparatus having an operating mode for performing an operation on the apparatus and an explaining mode for presenting an explanation describing an operation on the apparatus, comprising:
   a presentation unit constructed to present the explanation for an operation in the explaining mode;
   a storage unit constructed to store a history of user inputs; and
   a movement control unit constructed to switch from the explaining mode to the operating mode and to perform an operation according to the history of user inputs stored in said storage unit, responsive to a preset first user input,
   wherein said movement control unit switches from the explaining mode to the operating mode without performing an operation according to the history of user inputs stored in the storage unit, responsive to a preset second user input, and
   wherein in the case that the history of user inputs indicates an operation to an input device that is not automatically restored to a previous status and there is selection of the preset second user input, said movement control unit instructs the user to restore the input device to the previous status, and switches from the explaining mode to the operating mode after confirming that the input device has been restored to the previous status.

2. The information processing apparatus according to claim 1, wherein said movement control unit switches to the explaining mode in response to the preset second user input.

3. The information processing apparatus according to claim 2, wherein said movement control unit switches from said explaining mode to said operating mode in response to the first user input, after confirming that the status of every input device on the apparatus has been restored to the status that it was in immediately before switching to the explaining mode.

4. The information processing apparatus according to claim 1, wherein the input device is a manual input switching unit movable from a first position to a second position.

5. The information processing apparatus according to claim 4, wherein the manual input switching unit is movable to at least three positions.

6. The information processing apparatus according to claim 5, wherein the movement control unit instructs the user to restore the input device to the previous status by identifying which of the at least three positions to which the manual input switching unit should be moved.

7. An information processing method of an apparatus having an operating mode for performing an operation on the apparatus and an explaining mode for presenting an explanation describing an operation on the apparatus, comprising:
   a presentation step of presenting the explanation for an operation in said explaining mode;
   a storage step of storing a history of user inputs in a storage unit; and
   a movement control step of switching from the explaining mode to the operating mode and performing an operation according to the history of user inputs stored in the storage unit, responsive to a preset first user input,
   wherein said movement control step switches from the explaining mode to the operating mode without performing an operation according to the history of user inputs stored in the storage step, responsive to a preset second user input, and
   wherein in the case that the history of user inputs indicates an operation to an input device that is not automatically restored to a previous status and there is selection of the preset second user input, said movement control step instructs the user to restore the input device to the previous status, and switches from the explaining mode to the operating mode after confirming that the input device has been restored to the previous status.

8. The information processing method according to claim 7, wherein said movement control step comprises switching to the operating mode in response to the preset second user input.

9. The information processing method according to claim 8, wherein said movement control step comprises switching from the explaining mode to the operating mode in response to the first user input, after confirming that the status of every input device on the apparatus has been restored to the status that it was in immediately before switching to the explaining mode.

10. A computer-readable storage medium storing a control program for enabling a computer to perform the information processing method according to claim 7.

11. The information processing method according to claim 7, wherein the input device is a manual input switching unit movable from a first position to a second position.

12. The information processing method according to claim 11, wherein the manual input switching unit is movable to at least three positions.

13. The information processing method according to claim 12, wherein the movement control step instructs the user to restore the input device to the previous status by identifying which of the at least three positions to which the manual input switching unit should be moved.

* * * * *